(12) United States Patent
Machac, Jr. et al.

(10) Patent No.: US 6,608,012 B2
(45) Date of Patent: Aug. 19, 2003

(54) PROCESS AND FORMULATIONS TO REMOVE PAINT AND PRIMER COATINGS FROM THERMOPLASTIC POLYOLEFIN SUBSTRATES

(75) Inventors: James R. Machac, Jr., Lago Vista, TX (US); Susan A. Woodrum, Round Rock, TX (US); Howard P. Klein, Austin, TX (US); Edward T. Marquis, Austin, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 150 days.

(21) Appl. No.: 09/843,330

(22) Filed: Apr. 26, 2001

(65) Prior Publication Data

US 2002/0198124 A1 Dec. 26, 2002

(51) Int. Cl.$^7$ .................................................. C11D 3/44
(52) U.S. Cl. ....................... 510/212; 510/201; 510/202; 510/206; 510/407; 510/417; 134/38; 134/39; 134/40
(58) Field of Search .............................. 134/38, 39, 40; 510/201, 202, 206, 407, 417, 505, 506, 212

(56) References Cited

U.S. PATENT DOCUMENTS

| | | | | |
|---|---|---|---|---|
| 5,167,853 A | * | 12/1992 | Stevens | 510/106 |
| 5,346,640 A | * | 9/1994 | Leys | 510/174 |
| 5,578,135 A | | 11/1996 | Lohr et al. | 134/7 |
| 6,040,284 A | | 3/2000 | Marquis et al. | 510/201 |
| 6,159,915 A | | 12/2000 | Machac, Jr. et al. | 510/201 |
| 6,169,061 B1 | * | 1/2001 | Machac, Jr. et al. | 510/201 |

FOREIGN PATENT DOCUMENTS

| | | |
|---|---|---|
| EP | 0 659 798 A1 | 12/1993 |
| EP | 0 659 813 A1 | 6/1995 |

* cited by examiner

Primary Examiner—George E. Webb
(74) Attorney, Agent, or Firm—Gardere Wynne Sewell LLP

(57) ABSTRACT

The present invention includes methods and compositions for the removal of coatings such as paint from surfaces. The methods of the present invention are typically conducted between about 45° C. and about 75° C., and the compositions typically contain a carbonate, a dibasic ester, a pyrrolidine, a mono-ester. The formulations of the present invention typically exhibit a high efficacy in the removal of paint while having a low level of toxicity.

7 Claims, No Drawings

US 6,608,012 B2

PROCESS AND FORMULATIONS TO REMOVE PAINT AND PRIMER COATINGS FROM THERMOPLASTIC POLYOLEFIN SUBSTRATES

FIELD OF THE INVENTION

This invention relates to methods and compositions for paint and coating removal. More particularly, this invention relates to compositions containing a carbonate such as alkylene carbonate or dialkyl carbonate or both, dibasic ester, or a pyrrolidone and a mono-ester.

BACKGROUND OF THE INVENTION

Paint removing compositions are commonly used in industry, such as for stripping paint from thermoplastic olefin (TPO) surfaces that make up automotive body panels and bumpers. Conventional paint remover compositions include methylene chloride, phenol, or caustic. Each of these materials, however, has inherent problems during use. While methylene chloride-based compositions are very effective as paint removers, methylene chloride is a highly volatile material that is considered toxic. Similarly, phenol is highly toxic. Furthermore, caustic causes burns and attacks aluminum. Due to the deficiencies and disadvantages of conventional paint removing compositions, new paint removing compositions are highly desirable.

SUMMARY OF THE INVENTION

The present invention provides formulations and methods for the removal of coatings, especially paint, using less hazardous materials than conventional processes.

One form of the present invention is a method for removing coatings including the steps of formulating a composition comprising a carbonate, a dibasic ester and a mono-ester, and optionally a ketone, optionally a glycol ether, optionally an alcohol, optionally an organic sulfur-containing compound, and also optionally containing a thickener. The composition is then used to treat a coated surface by dipping, brushing, or any other suitable technique at a temperature between about 45° C. and 75° C.

Another form of the present invention is a method for removing coatings including the steps of formulating a composition comprising a carbonate, a pyrrolidone and a mono-ester, and optionally a ketone, optionally a glycol ether, optionally an alcohol, optionally an organic sulfur-containing compound, and also optionally containing a thickener. The composition is then used to treat a coated surface by dipping, brushing, or any other suitable technique at a temperature between about 45° C. and 75° C.

Still another form of the present invention is a composition for removing coatings that includes a carbonate, a pyrrolidone and a mono-ester, and optionally a ketone, optionally a glycol ether, optionally an alcohol, optionally an organic sulfur-containing compound, and also optionally containing a thickener.

DETAILED DESCRIPTION OF THE INVENTION

The compositions of this invention contain a carbonate such as alkylene carbonate or dialkyl carbonate or both, dibasic ester and a mono-ester or N-methyl-2-pyrrolidone. The carbonates that may be employed in the practice of this invention include alkylene carbonates and dialkyl carbonates. The alkylene carbonate used in the present invention can contain from 2 to 10 carbon atoms. Representative examples of alkylene carbonates that may be employed in the practice of this invention include ethylene carbonate and propylene carbonate. Mixtures of carbonates may also be employed. In the practice of this invention, alkylene carbonates are preferred, and among the alkylene carbonates, propylene carbonate is preferred.

The dialkyl carbonate used in the present invention may contain from 3 to 25 carbon atoms. The dialkyl carbonate may be of formula R—$CO_3$—R', wherein R and R' may be the same or different, and may independently in each occurrence be alkyl of from 1 to about 12 carbon atoms.

In one embodiment, the dialkyl carbonate may be dimethyl carbonate, diethyl carbonate, or a mixture thereof. The amount of alkylene carbonate, dialkyl carbonate or both used in the practice of this invention may vary widely. Typically the total amount of carbonate is from about 0.1 to about 90 percent by weight of the total composition. In one embodiment, the amount is from about 10 to about 50 percent by weight, preferably from about 15 to about 25 percent by weight.

In general, the dibasic ester (DBE) used in this invention includes aliphatic diesters having a molecular weight of up to about 200. DBE has the advantage of being considered to be safe and of low toxicity. More than one dibasic ester can be used in the present compositions. DBE is a well-known material and is currently available commercially. In general, the DBE used in this invention may be described as being a $C_1$ to $C_6$ dialkyl ester of a $C_2$ to $C_{10}$ aliphatic di-acid, and particularly a $C_1$ to $C_4$ dialkyl ester of a $C_2$ to $C_6$ aliphatic di-acid. For example, the DBE used in the practice of this invention may be derived from various di-acids such as from adipic acid, glutaric acid and succinic acid.

The amount of DBE used in the practice of this invention may vary widely. In general, the amount of DBE may be from about 0.1 percent by weight to about 90 percent by weight, more typically in the range from about 5 to about 50 percent by weight. In one embodiment of this invention, the DBE is present in an amount in the range from 15 to about 45 percent by weight of the total composition, preferably from about 20 to about 45 percent. The mono-esters that may employed in the practice of this invention may vary widely.

Any pyrrolidone is appropriate as a reagent for the present invention, however N-methyl-2-pyrrolidone is preferred. The amount of pyrrolidone used in the present invention can vary greatly from about 10 weight percent to about 70 weight percent. The preferred range is from about 20 weight percent to about 50 weight percent.

The mono-esters that may be used in the practice of this invention typically contain up to about 20 carbons. The mono-esters may include other functional groups in the compound. For instance, the mono-esters may also include ether groups, such as methyl, propyl or butyl ether groups. Representative non-limiting examples of esters that may be employed in the practice of this invention include ethyl acetate, butyl acetate, ethyl-3-ethoxy-propionate, propylene glycol methyl ether acetate, propylene glycol butyl ether acetate, dipropylene glycol methyl ether acetate and dipropylene glycol butyl ether acetate. Likewise, cyclic esters such as butyrolactone may be employed in the practice of this invention. Preferred mono-esters include an ether group. Ethyl-3-ethoxy-propionate ("EEP") is a representative preferred mono-ester which is considered to be safe and of low toxicity. The amount of mono-ester used in the practice of this invention may vary widely. Typically the amount is from about 0.1 to about 90 percent by weight of the total composition. In one embodiment, the amount is from about 5 to about 50 percent, preferably from about 15 to about 45 percent, and more preferably from about 20 to about 40 percent.

The organic sulfur-containing compounds that may employed in the practice of this invention may vary widely. The organic sulfur-containing compounds that may be used in the practice of this invention typically contain up to about 20 carbons. The organic sulfur-containing compounds may include other functional groups in the compound. Representative examples of sulfur-containing compounds that may be employed in the practice of this invention include dimethylsulfoxide (DMSO) and sulfolane. DMSO, for instance, is considered to be safe and of low toxicity. The amount of organic sulfur-containing compound used in the practice of this invention may vary widely. Typically the total amount of organic sulfur-containing compound is from about 0.1 to about 50 percent by weight of the total composition. In one embodiment, the amount is from about 5 to about 40 percent by weight, preferably from about 10 to about 30 percent by weight.

The ketones that may be employed in the practice of this invention may vary widely. The ketones that may be used in the practice of this invention typically contain up to about 20 carbons and are typically aliphatic compounds. The ketones may include other functional groups in the compound. Representative non-limiting examples of ketones that may be used in the practice of this invention include acetone, methyl ethyl ketone (MEK), 5-methyl-2-hexanone (MIAK), methyl isobutyl ketone and methyl isoamylbutone. The amount of ketone used in the practice of this invention may vary widely. Typically the total amount of ketone is from about 0.1 to about 50 percent by weight of the total composition. In one embodiment, the amount is from about 5 to about 20 percent by weight, preferably from about 5 to about 15 percent by weight.

The glycol ethers that may employed in the practice of this invention may vary widely. The glycol ethers that may be used in the practice of this invention typically contain up to about 20 carbons. The glycol ethers may include other functional groups in the compound. Representative non-limiting examples of useful glycol ethers include glycol ethers such as propylene glycol methyl ether (PM), dipropylene glycol methyl ether (DPM), or dipropylene glycol n-butyl ether (DPNB), ethylene glycol butyl ether (EB) and dipropylene glycol butyl ether (DB). The amount of glycol ether used in the practice of this invention may vary widely. Typically the total amount of glycol ether is from about 0.1 to about 50 percent by weight of the total composition. In one embodiment, the amount is from about 5 to about 20 percent by weight, preferably from about 5 to about 15 percent by weight.

The compositions of this invention may optionally include an alcohol. Representative examples of such alcohols include methanol, ethanol, propanol, butanol, and benzyl alcohol. In the practice of this invention, benzyl alcohol is preferred. Generally, if alcohol is present, compositions of this invention contain from 0 to about 90 percent by weight alcohol.

In certain embodiments of this invention, the compositions contain from about 10 to about 50 percent by weight of the carbonate, from about 15 to about 45 percent by weight of DBE, and from about 15 to about 45 percent of the mono-ester, with the percentages totaling 100.

In addition to the components described above, it is contemplated that the compositions of this invention may optionally contain activators such as formic or oxalic acid, thickeners, surfactants, acids or bases, stabilizers, corrosion inhibitors, and other additives commonly used in paint removers.

Non-limiting examples of representative thickeners include cellulose ethers such hydroxypropyl cellulose, ethyl cellulose, ethyl hydroxyethyl cellulose, methyl cellulose, and other alkyl or hydroxy alkyl cellulose; silica including colloidal silica; clays such as bentonite and montmorillonite starch; alumina including colloidal alumina; gum arabic; tragacanth; agar; sugar derivatives; high molecular weight polyethylene oxides; guar gum; xanthan gum; polyvinyl pyrrolidone and methyl vinyl ether/maleic anhydride copolymers. It has been found that certain hydroxy alkyl cellulose ethers and certain experimental polymers are particularly effective and resistant to breakdown in the practice of this invention. Such cellulose ethers are available commercially from The Dow Chemical Company under the tradenames Methocel® F4 MPRG and Methocel® E 311. When a thickener is used, the amount of such thickener can vary depending on the desired level of thickening for the given application. In general, the amount of thickener employed is about 1 to about 4 percent by weight.

Non-limiting examples of representative corrosion inhibitors include ethoxylated butynediol, petroleum sulfonates, blends of propargyl alcohol and thiourea. If used, the amount of such corrosion inhibitors is typically up to about 10% by weight of the total composition.

Non-limiting examples of representative surfactants which may optionally be used in the practice of this invention include non-ionic, anionic, cationic and amphoteric surfactants, such as monocarboxyl cocoimidoazoline, higher alkyl sulfate sodium salts, tridecyloxy poly(alkyleneoxy ethanol), ethoxylated or propoxylated alkyl phenol, alkyl sulfoamides, C10-18 alkaryl sulfonates such as alkylbenzene sulfonates, cocoamphaodipropionate, cetylpalmitic alkanol amides, hydrogenated castor oil, isooctylphenyl polyethoxy ethanol, sorbitan monopalmitate, C8-18 alkyl pyrrolidone, cocoaminoprpionic acid and polyethoxy amino salts thereof. When used, the amount of surfactant should be sufficient to render the composition miscible. If used, the amount of surfactant is typically from about 0.1 to about 10 percent by weight of the total composition.

The compositions of this invention may also optionally contain a wide variety of other organic cosolvents. Likewise, the present invention may be practiced in the absence of one or more of such solvents. Non-limiting examples of representative classes of such other cosolvents include hydrocarbons, ethers, phenols, glycols, lactones, chlorinated hydrocarbons, aromatic hydrocarbons nitrated hydrocarbons and amides. Such cosolvents may be polar or non-polar, may be protic or aprotic, may be cyclic, branched, or straight-chain, and may contain one or more functional groups. Representative examples of common hydrocarbon solvents include hexane, toluene, xylene, and mixtures of aliphatic and aromatic hydrocarbons. Representative examples of common ether solvents include dibutyl ether, ethyl ether, and diphenyl ether. Representative examples of common phenols include phenol and the cresols and resorinols. Representative examples of common glycol solvents include ethylene, propylene and butylene glycols as well as methyl propane diol. Representative examples of common chlorinated hydrocarbon solvents include methylene chloride, methyl chloroform, chlorobenzenes and dichlorobenzenes. Representative examples of common nitrated hydrocarbon solvents include nitroethane and nitropropane. Representative examples of common amide solvents include formamide, dimethyl formamide, acetamide, and dimethylacetamide.

When a given composition containing a given carbonate does not form a miscible composition, a co-solvent may be used to provide a miscible composition. For instance, a glycol ether may be added as a co-solvent in an amount effective to solubilize the components of the mixture. Such glycol ethers may be included for other purposes as well. Such amounts may vary depending on the specific composition of interest, as one of skill in the art may appreciate. The particular type and amount of glycol ether which will afford a miscible composition may be identified by routine experimentation. Also, an alcohol or alkylene carbonate may be beneficially employed as a co-solvent to provide miscible dialkyl carbonate compositions of this invention.

The conditions under which the paint stripping methods of this invention may be practiced may vary. Typically, the process will be conducted under heated conditions. Temperatures from about 45° C. to about 75° C., are typically used, with the preferred temperature being about 70° C. The paint remover composition may be applied by any convenient method such as by dipping, spraying, or brushing the composition onto the paint surface. Dipping is the preferred method of administration, and the dipping solution may be agitated or sonicated to aid in the removal of the coating. The coated surface may also be agitated if appropriate.

For resistant painted surfaces it may be desirable to apply the composition two or more times to fully separate the paint from the surface. It may be desirable to use a rag, scraper, sand blaster, or the like to fully remove paint chips from the surface after the paint remover composition has been given time to fully act. Alternatively, high pressure water spray may be employed to remove paint chips and residual paint remover composition. It may be appreciated that the time required for the paint remover composition to act will vary due to a variety of factors such as temperature, paint type, and particular paint remover formulation being used. In general, application times are between one minute and one hour, although longer application times may be used.

The following examples are illustrative of this invention and are not intended to be limit the scope of the invention or claims hereto. Unless otherwise denoted all percentages are by weight. In the tables, "N/A" denotes "not available," "PC" denotes propylene carbonate; EC-50 denotes a 50/50 blend of propylene carbonate and ethylene carbonate; EEP denotes ethyl-3-ethoxy propionate; DMSO denotes dimethylsulfoxide; XTC-1 denotes epichlorohydrin carbonate; NMP denotes N-methyl-2-pyrrolidine; PMA denotes propylene glycol methyl ether acetate; and the thickener was Methocel.TM 311. Other abbreviations are as previously defined in this application.

EXAMPLE Sample compositions A–F were prepared by combining them in a container with stirring. The percentages of respective components of Samples A–F are shown in Table 1.

TABLE 1

| Sample | PC % | EC-50 % | DMSO % | DBE % | EEP % | DPM % | MIAK % | Thickener % |
|---|---|---|---|---|---|---|---|---|
| A | 19.5 | 0 | 0 | 40.5 | 40 | 0 | 0 | 0 |
| B | 0 | 19.5 | 0 | 40.5 | 40 | 0 | 0 | 0 |
| C | 19.5 | 0 | 22.5 | 34.5 | 23.5 | 0 | 0 | 0 |
| D | 19.5 | 0 | 20.5 | 20.5 | 20 | 10.5 | 9 | 0 |
| E | 19 | 0 | 22 | 34 | 23 | 0 | 0 | 2 |
| F | 19 | 0 | 20 | 20 | 20 | 10 | 9 | 2 |

Samples A–F were then tested in several experiments for their efficacy in paint stripping applications. The results are shown in Table 2. In Table 2, the results are in minutes.

TABLE 2

| Sample | Test 1 Vanished hardwood | Test 2 Latex on wood | Test 3 Latex enamel on wood | Test 4 Acrylic enamel on metal | Test 5 Latex enamel on metal | Test 6 Acrylic lacquer primer and finish |
|---|---|---|---|---|---|---|
| A | 11.93 | 1.08 | 1.75 | 1.53 | 2.47 | 13.13 |
| B | 9.3 | 2.58 | 0.87 | 2.77 | 5.77 | 14.63 |
| C | 4.72 | 2.53 | 2.22 | 4.9 | 3.05 | 7.28 |
| D | 7.03 | 2.15 | 2.67 | 5.52 | 4.83 | 12.3 |
| E | 2.9 | 2.98 | 2.43 | 4.68 | 2.98 | 10.58 |
| F | 2.8 | 2.75 | 2.75 | 1.2 | 1.523 | 11.1 |

The compositions were applied to actual automobile panels that were coated with an adhesion promoter (primer) layer, a pigment layer and a clear-coat layer. The data in Table 2 shows that the amount of time in minutes the formulations required to remove the coating. These rapid stripping times are analogous to times required for methylene chloride based paint strippers to remove the same coatings.

The data in Table 3 demonstrate the efficacy of formulations containing N-mehtyl-2-pyrrolidine on automobile bumper panels painted white. Similar results were obtained on panels painted bronze and black. There are also examples in Table 3 using methylene chloride (MeCl) for comparison. The data indicate that these formulations are comparable to the MeCl formulations.

TABLE 3

Performed at 70 Deg C.

| FORMULATIONS PC | MeCl | EEP | NMP | Formic Acid | Maleic Acid | XTC-1 | DPM | MIAK | PMA | PM | White Panel Blister | Peeled |
|---|---|---|---|---|---|---|---|---|---|---|---|---|
|  |  | 25 |  |  |  | 25 | 12.5 | 25 | 12.5 |  |  | 20 min |
|  | 50 |  | 50 |  |  |  |  |  |  |  |  | 15 min |
| 40 |  | 20 | 40 |  |  |  |  |  |  |  |  | 10 min |
| 40 |  | 40 | 20 |  |  |  |  |  |  |  |  | 10 min |
|  | 100* |  |  |  |  |  |  |  |  |  |  | <1 min |
|  | 99.5* |  |  | 0.5 |  |  |  |  |  |  |  | <1 min |
| 19.5 |  | 40 | 40 |  | 0.5 |  |  |  |  |  | 15 min |  |
| 19.5 |  | 40 | 40 | 0.5 |  |  |  |  |  |  |  | 10 min |
| 99.5 |  |  |  |  | 0.5 |  |  |  |  |  |  |  |
| 99.5 |  |  |  | 0.5 |  |  |  |  |  |  |  |  |
| 50 |  |  | 50 |  |  |  |  |  |  |  | 22 min | 35 min |

TABLE 3-continued

Performed at 70 Deg C.

| FORMULATIONS PC | MeCl | EEP | NMP | Formic Acid | Maleic Acid | XTC-1 | DPM | MIAK | PMA | PM | White Panel Blister | Peeled |
|---|---|---|---|---|---|---|---|---|---|---|---|---|
| 50 |  | 50 |  |  |  |  |  |  |  |  | 20 min | 25 min |
| 60 |  | 20 | 20 |  |  |  |  |  |  |  |  | 30 min |
| 19.5 |  | 40.5 | 40 |  |  |  |  |  |  |  | 12 min | 15 min |
|  |  | 40.5 | 40 |  | 19.5 |  |  |  |  |  |  | 10 min |
|  |  |  |  |  |  | 100 |  |  |  |  |  |  |

*Performed at Room Temperature

All of the formulations in Tables 1 and 3 perform similarly to the more dangerous methylene chloride based formulations. Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A composition for removing coatings comprising:
   a carbonate, a pyrrolidone, a monoester, a ketone, a glycol ether, an organic sulfur-containing compound and optionally an alcohol and optionally a thickener wherein the composition contains from about 10% to about 50% by weight of the carbonate, from about 15% to about 45% by weight of the pyrrolidone, from about 15% to about 45% by weight of the monoester, from about 5% to about 20% by weight of the ketone, from about 5% to about 20% by weight of the glycol ether and from about 10% to about 30% by weight of the sulfur-containing compound.

2. The composition recited in claim 1 wherein the carbonate is an alkylene carbonate containing from 2 to 10 carbon atoms.

3. The composition recited in claim 1, wherein the carbonate is propylene carbonate or ethylene carbonate or a mixture of propylene carbonate and ethylene carbonate.

4. The composition recited in claim 1, wherein the pyrrolidone is N-methyl-2-pyrolidone.

5. The composition recited in claim 1, wherein the glycol ether has up to 20 carbon atoms.

6. The composition recited in claim 1, wherein the ketone has up to 20 carbon atoms.

7. The composition recited in claim 1, wherein the sulfur-containing compound is dimethyl sulfoxide.

* * * * *